United States Patent Office 2,845,381
Patented July 29, 1958

2,845,381

PREPARATIONS FOR THE TREATMENT OF THE HUMAN SKIN CONTAINING ANDROSTANE DERIVATIVES

Walter Joseph Tindall, London, England, assignor, by mesne assignments, to Organon Inc., Orange, N. J., a company of New Jersey No Drawing. Application August 20, 1954
Serial No. 451,283

Claims priority, application Great Britain August 26, 1953

9 Claims. (Cl. 167—90)

This invention relates to preparations for the treatment of the human skin. The preparations are primarily intended for cosmetic purposes to improve the personal appearance particularly in the case of ageing or senile skin.

As applied for cosmetic purposes, the preparations according to the invention aim at stimulating and replacing the epidermis, thus minimizing or reducing the effects of ageing, especially preventing the dehydration and atrophy which are basically the cause of the changes seen in ageing skin.

Cosmetic creams have been available on the market, which contain oestrogens, such as oestrone, oestradiol and stilboestrol, and while such preparations have been effective to some extent in reducing wrinkles and reducing the other effects of ageing, mainly by stimulating epidermal skin mitosis, their use has been attended by the risk of undesirable side effects particularly on the uterus and breast and with the possibility of activating early malignant changes.

Another disadvantage of these known substances is that the stimulation of the skin mitosis is only temporary. For example, it has been found that after about two weeks' application cessation of the stimulation occurs. This effect appears to be due to the increased size of the adrenal cortex induced by the oestrogen and it is known that the cessation of mitrosis can be brought about by the adrenal hormones. Furthermore, excessive dosage of oestrogen does cause cessation of mitosis.

It has now been discovered that certain substances closely related to the sexually active hormones but themselves substantially free from sexual activity as ordinarily understood, i. e. such as show substantially no activity in stimulating the secondary sex organs, are very effective for the purpose outlined above, and that, in consequence of the absence of sexual activity, the disadvantages previously encountered in such preparations are avoided.

In accordance with my present invention, a preparation for the treatment of human skin consists of a suitable vehicle capable of being spread on the skin and containing as active ingredient a steroid compound which is virtually free from male or female sexual activity, as herein defined, and is a derivative of $\Delta^5$-androsten-3$\beta$-ol or $\Delta^4$-androsten-3-one or androstan-3$\beta$-ol or androstan-3-one, substituted C17 with a keto group or a hydroxyl group (in either alpha or beta position), with or without an unsubstituted alkyl group which may or may not be saturated, such compounds having 19, 20 or 21 carbon atoms (not counting the carbon atoms of any ester group present); and excluding testosterone and its esters and methyl testosterone.

As a first example of the substance according to the invention, I mention inactive (non-androgenic and non-oestrogenic) stereoisomer of testosterone ($\Delta^4$-androsten-17$\alpha$-ol-3-one) known as cis-testosterone, which has proved quite satisfactory in experimental stimulation of cell mitosis in the skin.

A second example according to the invention is $\Delta^5$-androstendiol-3$\beta$:17$\alpha$.

A third example consists of 17$\alpha$-ethinyl-$\Delta^4$-androsten-17$\beta$-ol-3-one (ethinyl testosterone, commonly called ethisterone), which is virtually inactive both as an androgen and as an oestrogen and has nevertheless proved to be fully active as a skin mitosis stimlant, better in this respect than oestrone.

In a clinical test, ethisterone in a cream base was applied twice daily to the skin of the arm of aged persons. After twenty-one days, a great change was apparent in the skin structure. There was a great increase in the epidermal thickness almost entirely confined to the layers of living uncornified cells, the outer cornified layers being relatively unaffected. The line of demarcation between the dermis and the epidermis, which is well defined in untreated senile skin, became again partially obscured, as it is in normal youthful skin, by the marginal spines of the basal cells of the stratum germinativum. The basal cells became enlarged. The dermal papillae producing the folded appearance of the dermal-epidermal junction was virtually absent in the untreated state, but after treatment the development of these papillae had returned virtually to the normal youthful state.

The above listed substances are also virtually inactive as an androgen or as an oestrogen and have proved to be fully active as skin-mitosis stimulants.

The following list of substances shows further examples of substances which can be used according to the invention:

(4) $\Delta^5$-androstendiol-3$\beta$:17$\beta$
(5) 17$\alpha$-methyl-$\Delta^5$-androstendiol-3$\beta$:17$\beta$
(6) 17$\alpha$-ethyl-$\Delta^5$-androstendiol-3$\beta$:17$\beta$
(7) 17$\alpha$-vinyl-$\Delta^5$-androstendiol-3$\beta$:17$\beta$
(8) 17$\alpha$-ethinyl-$\Delta^5$-androstendiol-3$\beta$:17$\beta$
(9) 17$\alpha$-ethyl-$\Delta^4$-androsten-17$\beta$-ol-3-one (17$\alpha$ ethyl testosterone)
(10) 17$\alpha$-vinyl-$\Delta^4$-androsten-17$\beta$-ol-3-one (17$\alpha$ vinyl testosterone)
(11) Androstanediol-3$\beta$:17$\beta$
(12) Androstanediol-3$\beta$:17$\alpha$
(13) 17$\alpha$-methylandrostanediol-3$\beta$:17$\beta$
(14) 17$\alpha$-ethinylandrostanediol-3$\beta$:17$\beta$
(15) 17$\alpha$-vinylandrostanediol-3$\beta$:17$\beta$
(16) 17$\alpha$-ethylandrostanediol-3$\beta$:17$\beta$
(17) Androstan-17$\beta$-ol-3-one
(18) Androstan-17$\alpha$-ol-3-one
(19) 17$\alpha$-methyl-androstan-17$\beta$-ol-3-one
(20) 17$\alpha$-ethyl-androstan-17$\beta$-ol-3-one
(21) 17$\alpha$-vinyl-androstan-17$\beta$-ol-3one
(22) 17$\alpha$-ethinyl-androstan-17$\beta$-ol-3-one
(23) Androstanedione-3:17
(24) Androstan-3$\beta$-ol-17-one (epiandrosterone)
(25) $\Delta^5$-androsten-3$\beta$ - ol - 17 - one (dehydro-epiandrosterone)
(26) $\Delta^4$-androstenedione As applied to a cosmetic cream, the present invention is also concerned with the nature of the cream base utilized for the incorporation of the sexually inactive steroid compounds herein referred to. As heretofore compounded, such creams commonly included a proportion of cholesterol either as a specially incorporated component of the cream or as a constituent of lanolin which is frequently employed as a cream base constituent. However, it is already known that cholesterol promotes the absorption of lipoid-soluble substances through the skin and that the removal of cholesterol from the skin and from the base vehicle retards or inhibits such absorption.

According to a further feature of the invention, a cream base or vehicle for the application to the skin of the steroid substances of the invention, is, therefore, made up without any cholesterol, thus ensuring that the active substances are retained in the skin and not passed to any appreciable extent into the general circulation. In this way, the action of the achieve substances is confined for the major part to the surface layers of the skin with a consequent improvement in the efficiency of the application of the cream.

Such a cream base may consist mainly of water, glyceryl monostearate and glycerine with a small proportion of arachis oil and of cetyl alcohol.

The amount of active substance which may be incorporated in a cream base either of the above character or of the more conventional lanolin based types may vary within quite wide limits. The upper limit is however generally set by the relatively low solubility of the active substance in an organic solvent capable of being added to and mixed with the cream base. A convenient solvent for this purpose is propylene glycol. The lower limit is set by a figure below which there is insufficient of the active substance present to produce any useful effect. Under normal circumstances and to obtain a cream having a practically useful effect it may be said that the amount of active substance varies from the maximum amount that can be incorporated in the final ointment, taking into account the solubility of the substance in an organic solvent, and the lower limit may be perhaps one-tenth to one-twentieth of that amount depending partly on the purpose of use of the ointment and the particular selected substance used. The following Examples 1 to 7 illustrate ointment-like preparations according to the invention based on the use of a non-cholesterol cream base.

Example 1

A cream base consists of the following substances, the proportions being by weight:

|  | Parts |
|---|---|
| Glyceryl monostearate | 15 |
| Arachis oil | 5 |
| Cetyl alcohol | 1 |
| Glycerine | 10 |
| Water | 100 |

The glyceryl monostearate and the glycerine are mixed with the water with a small amount of the arachis oil and cetyl alcohol, and then the rest of the last named substance added with continued mixing. In the preparation of a cosmetic cream, a quantity of ethisterone (17α-ethinyl-$\Delta^4$-androsten-17β-ol-3-one) is dissolved in sufficient organic solvent such as propylene glycol to dissolve it and the latter solution is then added to and intimately mixed with a cream base compounded as above explained. The amount of ethisterone added as an active substance is such that 1 to 10 mg. thereof is present in every ounce of the finished cream.

Example 2

To a cream base of the character disclosed in Example 1 there is added with thorough mixing a solution of $\Delta^5$-androstendiol-3β:17α in an organic solvent. The amount of the above substance present is such that 1 to 10 mg. are present for each ounce of the cream base.

Example 3

To a cream base of the character disclosed in Example 1 there is added with thorough mixing a solution of $\Delta^4$-androsten 17α-ol-3-one in an organic solvent. The amount of the above substance present is such that 5 to 20 mg. are present for each ounce of the cream base.

Example 4

To a cream base of the character disclosed in Example 1 there is added with thorough mixing a solution of 17α-ethinyl-$\Delta^5$-androstendiol-3β:17β in an organic solvent. The amount of the above substance present is such that 5 to 20 mg. are present for each ounce of the cream base.

Example 5

To a cream base of the character disclosed in Example 1 there is added with thorough mixing a solution of androstanediol - 3β:17β in an organic solvent. The amount of the above substance present is such that 2 to 15 mg. are present for each ounce of the cream base.

Example 6

To a cream base of the character disclosed in Example 1 there is added with thorough mixing a solution of $\Delta^5$-androstostendiol-3β:17β in an organic solvent. The amount of the above substance present is such that 2 to 15 mg. are present for each ounce of the cream base.

Example 7

To a cream base of the character disclosed in Example 1 there is added with thorough mixing a solution of 17α-methylandrostan-17β-ol-3-one in an organic solvent. The amount of the above substance present is such that 2 to 15 mg. are present for each ounce of the cream base.

Other types of base or vehicle can be used for other purposes. For example, an ethical medical preparation may be used as the vehicle in the case of a preparation for the treatment of burns, while an oil is suitable for certain other medicinal treatment preparations.

The invention is not of course specifically restricted to the use of non-cholesterol bases; the use of such bases is desirable as inhibiting the absorption of the active substances through the skin. The following is an example showing the use of a cholesterol-containing base:

Example 8

A lanolin base is made up by mixing the following ingredients, the parts being given by weight:

|  | Parts |
|---|---|
| Cetyl alcohol | 1 |
| Sodium alginate | 1 |
| Glycerine | 1 |
| Wool alcohol BP | 30 |
| Arachis oil | 5 |
| Water | 62 |

The above compounds are thoroughly mixed together to form a soft cream to which is added a solution of $\Delta^4$-androsten-17α-ol-3-one dissolved in organic solvent to such an extent and the amount of such solvent being such that the resulting base contains 2 to 5 mg. of the active substance per ounce of the finished cream.

The compounds referred to above are all known substances the manners of preparation of which are known to those skilled in the art.

I claim:

1. Cosmetic preparation for the treatment of human skin, comprising a topical ointment vehicle and at least a single steroid of the formula:

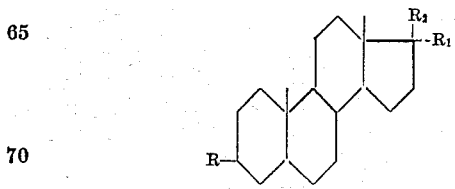

wherein R is a member selected from the group consisting of hydroxyl and oxo, $R_1$ is of the group consisting of α-ethinyl and α-hydroxyl, and $R_2$ is of the group of β-hydroxyl and hydrogen.

2. The preparation according to claim 1, the androstane derivative containing a double bond at the 4-position.

3. The preparation according to claim 1, the androstane derivative containing a double bond at the 5-position.

4. The preparation according to claim 1, the active ingredient being ethisterone.

5. The preparation according to claim 1, the active ingredient being 5-androstene-3-beta:17-alpha diol.

6. The preparation according to claim 1, the active ingredient being 17-alpha ethinyl-5-androstene-3-beta:17-beta diol.

7. The preparation according to claim 1, the active ingredient being 4-androstene-17-alpha-ol-3-one.

8. The preparation according to claim 1, the active ingredient being androstane-3-beta:17-alpha diol.

9. The preparation according to claim 1, the vehicle being of a creamy nature and adapted to be absorbed through the skin.

References Cited in the file of this patent

The Drug and Cosmetic Ind., vol. 54, No. 5, May 1944, pp. 528–529, 603, 604 and 605 (pp. 604 and 605 pert.).

Unlisted Drugs, vol. 5, No. 1, January 31, 1953, p. 12.

Unlisted Drugs, vol. 5, No. 2, February 28, 1953, p. 29.

The Am. Perfumer, October 1936, p. 49.

Wells: Am. Perfumer and Essen. Oil Rev., vol. 61, No. 1, January 1953, pp. 19, 21–24.

The U. S. Dispensatory, 24th ed., 1947, J. B. Lippincott Co., Phila., Pa., pp. 244, 245 and 511.

Behrman: J. A. M. A., vol. 155, No. 2, May 8, 1954, pp. 119–123.